(12) United States Patent
Lee et al.

(10) Patent No.: US 11,505,075 B2
(45) Date of Patent: Nov. 22, 2022

(54) VEHICLE INCLUDING FUEL CELL, BATTERY-CHARGING METHOD FOR THE VEHICLE, AND RECORDING MEDIUM HAVING RECORDED THEREIN PROGRAM FOR EXECUTING THE METHOD

(71) Applicants: HYUNDAI MOTOR COMPANY, Seoul (KR); KIA MOTORS CORPORATION, Seoul (KR)

(72) Inventors: Woo Young Lee, Yongin-si (KR); Ju Han Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 122 days.

(21) Appl. No.: 17/035,183

(22) Filed: Sep. 28, 2020

(65) Prior Publication Data
US 2021/0213842 A1 Jul. 15, 2021

(30) Foreign Application Priority Data
Jan. 9, 2020 (KR) .......................... 10-2020-0003072

(51) Int. Cl.
*B60L 53/22* (2019.01)
*H02J 7/00* (2006.01)
(Continued)

(52) U.S. Cl.
CPC ................ *B60L 53/22* (2019.02); *B60K 1/00* (2013.01); *B60L 50/40* (2019.02); *B60L 50/60* (2019.02);
(Continued)

(58) Field of Classification Search
CPC ........ H02J 15/008; H02J 7/34; H02J 2310/48; H02J 1/12; H02J 7/007182; Y02T 90/40;
(Continued)

(56) References Cited

U.S. PATENT DOCUMENTS

2003/0234634 A1* 12/2003 Lee ..................... H02M 3/1582
323/241
2012/0112684 A1* 5/2012 Xu .......................... B60L 53/22
320/101
(Continued)

FOREIGN PATENT DOCUMENTS

JP 2000-036308 A 2/2000
JP 2009-165243 A 7/2009
(Continued)

*Primary Examiner* — Jared Fureman
*Assistant Examiner* — Duc M Pham
(74) *Attorney, Agent, or Firm* — Morgan, Lewis & Bockius LLP (57) ABSTRACT

A vehicle includes a boost converter configured to bypass or to convert a stack voltage and output the bypassed or converted stack voltage as a first voltage in response to a first control signal, a first switching unit configured to be switched in response to a first switching signal to form a main path to supply the first voltage to a battery, a buck converter configured to convert and output a level of the first voltage to the battery as a second voltage in response to a second control signal, a second switching unit configured to be switched in response to a second switching signal to form a bypass path to supply the second voltage to the battery, and a controller configured to inspect a level of voltage charged in the battery and generate the first and second control signals and the first and second switching signals based thereon.

19 Claims, 7 Drawing Sheets

(51) Int. Cl.
  *H02M 3/158* (2006.01)
  *B60L 50/70* (2019.01)
  *B60L 50/60* (2019.01)
  *B60L 50/40* (2019.01)
  *B60K 1/00* (2006.01)
  *B60L 58/12* (2019.01)
  *H02P 27/06* (2006.01)

(52) U.S. Cl.
  CPC .............. *B60L 50/70* (2019.02); *B60L 58/12* (2019.02); *H02J 7/0048* (2020.01); *H02J 7/007182* (2020.01); *H02M 3/158* (2013.01); *B60L 2210/12* (2013.01); *B60L 2210/14* (2013.01); *H02J 2207/20* (2020.01); *H02P 27/06* (2013.01)

(58) Field of Classification Search
  CPC .......... Y02T 10/70; B60L 50/70; B60L 53/22; B60L 2210/12; B60L 58/12; H02M 3/156; H02M 1/007; H02P 2201/09; H02P 27/06; B60K 1/00
  See application file for complete search history.

(56) References Cited

U.S. PATENT DOCUMENTS

2014/0302415 A1* 10/2014 Peterson ............. H01M 8/0491
  429/434
2018/0026463 A1* 1/2018 Berg .................. H01M 8/0488
  320/101

FOREIGN PATENT DOCUMENTS

| JP | 5326228 B2 | 10/2013 |
| JP | 2017-091882 A | 5/2017 |
| KR | 10-1039679 B1 | 6/2011 |

* cited by examiner

VEHICLE INCLUDING FUEL CELL, BATTERY-CHARGING METHOD FOR THE VEHICLE, AND RECORDING MEDIUM HAVING RECORDED THEREIN PROGRAM FOR EXECUTING THE METHOD

CROSS-REFERENCE TO RELATED APPLICATION

The present application claims the benefit of priority to Korean Patent Application No. 10-2020-0003072, filed on Jan. 9, 2020 with the Korean Intellectual Property Office, the entire disclosure of which is hereby incorporated by reference.

TECHNICAL FIELD

Embodiments of the present disclosure relate to a vehicle including a fuel cell, a battery-charging method for the vehicle, and a recording medium having a program recorded therein for executing the method.

BACKGROUND

In a vehicle having a fuel cell including a cell stack, a battery is charged with power generated in the fuel cell, and a load such as a motor is driven by the power charged in the battery.

To this end, the vehicle includes a direct-current/direct-current (DC/DC) converter that boosts the stack voltage generated in the fuel cell. In this case, however, when the level of the voltage charged in the battery is lower than the level of the stack voltage, overcurrent may occur, which may cause damage to elements of the DC/DC converter or the battery.

The information disclosed in the Background section above is to aid in the understanding of the background of the present disclosure, and should not be taken as acknowledgement that this information forms any part of prior art.

SUMMARY

Accordingly, embodiments of the present disclosure are directed to a vehicle including a fuel cell, a battery-charging method for the vehicle, and a recording medium having a program recorded therein for executing the method that substantially obviate one or more problems due to limitations and disadvantages of the related art.

An object of the present disclosure is to provide a vehicle including a fuel cell, a battery-charging method for the vehicle, and a recording medium having a program recorded therein for executing the method that are capable of preventing elements or a battery from being damaged by overcurrent when the level of a voltage charged in the battery is lower than the level of stack voltage.

A vehicle including a fuel cell according to an exemplary embodiment may include a battery, a cell stack including a plurality of unit cells stacked on one another, a boost converter configured to bypass a stack voltage output from the cell stack, or to convert the level of the stack voltage and output the bypassed or converted stack voltage as a first voltage in response to a first control signal, a first switching unit configured to be switched in response to a first switching signal to form a main path to supply the first voltage to the battery, a buck converter configured to convert the level of the first voltage and output the converted first voltage to the battery as a second voltage in response to a second control signal and having second rated power lower than first rated power of the boost converter, a second switching unit configured to be switched in response to a second switching signal to form a bypass path to supply the second voltage to the battery, and a controller configured to inspect the level of a voltage charged in the battery and generate the first control signal, the second control signal, the first switching signal, and the second switching signal in response to the result of the inspection.

For example, the second rated power may be 5% to 10% of the first rated power.

For example, the second switching unit may have third rated power, and the third rated power may be 5% to 10% of the first rated power.

For example, the second switching unit may be disposed between the boost converter and the buck converter. Alternatively, the second switching unit may be disposed between the buck converter and the battery.

For example, the controller may generate the first switching signal and the second switching signal such that the first switching unit and the second switching unit are alternately switched.

For example, the boost converter may include a first capacitor disposed between an output terminal of a positive-electrode side of the cell stack and an output terminal of a negative-electrode side of the cell stack, a first inductor including a first end connected to the output terminal of the positive-electrode side of the cell stack, a first diode including a positive electrode connected to a second end of the first inductor, a second capacitor disposed between a negative electrode of the first diode and the output terminal of the negative-electrode side of the cell stack, and a first semiconductor switch configured to be switched on or off in response to the first control signal. The first semiconductor switch may be connected to the positive electrode of the first diode and the output terminal of the negative-electrode side of the cell stack and disposed between the positive electrode of the first diode and the output terminal of the negative-electrode side, and the controller may generate the first control signal such that the first semiconductor switch is switched off to form the bypass path or such that the first semiconductor switch is switched on to form the main path.

For example, the first switching unit may include a first switch disposed between the negative electrode of the first diode and an input terminal of a positive-electrode side of the battery, the first switch being switched in response to the first switching signal, and a second switch disposed between the output terminal of the negative-electrode side of the cell stack and an input terminal of a negative-electrode side of the battery, the second switch being switched in response to the first switching signal.

For example, the buck converter may include a second inductor including one side connected to the input terminal of the positive-electrode side of the battery, a second semiconductor switch configured to be switched on or off in response to the second control signal, the second semiconductor switch being disposed between the negative electrode of the first diode and a second side of the second inductor, and a second diode including a negative electrode connected to the second side of the second inductor and a positive electrode connected to the output terminal of the negative-electrode side of the cell stack, and the controller may generate the second control signal such that the second semiconductor switch is switched on to form the bypass path or such that the second semiconductor switch is switched off to form the main path.

For example, the second switching unit may include a third switch disposed between the one side of the second inductor and the input terminal of the positive-electrode side of the battery, the third switch being switched in response to the second switching signal, and a fourth switch disposed between the positive electrode of the second diode and the input terminal of the negative-electrode side of the battery, the fourth switch being switched in response to the second switching signal. Alternatively, for example, the second switching unit may include a fifth switch disposed between the negative electrode of the first diode and the second semiconductor switch, the fifth switch being switched in response to the second switching signal, and a sixth switch disposed between the output terminal of the negative-electrode side of the cell stack and the positive electrode of the second diode, the sixth switch being switched in response to the second switching signal.

For example, each of the second rated power and the third rated power may be determined according to the time required for the level of the voltage charged in the battery to reach the level of the stack voltage.

For example, the switch included in the first switching unit or the second switching unit may include a relay, a semiconductor switch, or a diode.

For example, the vehicle may further include a load stage connected to the main path and configured to receive the first voltage or to receive the voltage charged in the battery.

For example, the load stage may include an inverter connected to the input terminal of the positive-electrode side of the battery and the input terminal of the negative-electrode side of the battery, the inverter being configured to convert the first voltage supplied thereto in a direct current form into an alternating-current-type first voltage or to convert the voltage charged in the battery in a direct current form into an alternating-current-type second voltage, and a motor configured to be driven in response to the alternating-current-type first voltage or the alternating-current-type second voltage.

According to another exemplary embodiment, a battery-charging method for a vehicle, including a battery, a cell stack including a plurality of unit cells stacked on one another, a boost converter configured to bypass a stack voltage output from the cell stack or to convert a level of the stack voltage and output the bypassed or converted stack voltage as a first voltage, and a buck converter configured to convert a level of the first voltage and output the converted first voltage as a second voltage and having rated power lower than the rated power of the boost converter, may include inspecting a level of a voltage charged in the battery, forming a bypass path to supply the second voltage, formed by converting the level of the stack voltage bypassed from the boost converter, to the battery when the inspected level of the voltage charged in the battery has not reached the level of the stack voltage, and forming a main path to supply the first voltage having a level converted by the boost converter to the battery when the level of the voltage charged in the battery reaches the level of the stack voltage.

According to a further exemplary embodiment, a non-transitory computer-readable recording medium may have a program recorded therein for executing a battery-charging method for a vehicle including a cell stack including a plurality of unit cells stacked on one another, a boost converter configured to bypass a stack voltage output from the cell stack or to convert the level of the stack voltage and output the bypassed or converted stack voltage as a first voltage, a battery configured to be charged with the first voltage output from the boost converter, and a buck converter configured to convert the level of the first voltage and output the converted first voltage as a second voltage and having rated power lower than the rated power of the boost converter. The program, when executed by a processor, causes the processor to inspect the level of the voltage charged in the battery, to form a bypass path to supply the second voltage, formed by converting the level of the stack voltage bypassed from the boost converter, to the battery when the inspected level of the voltage charged in the battery has not reached the level of the stack voltage, and to form a main path to supply the first voltage having a level converted by the boost converter to the battery when the level of the voltage charged in the battery reaches the level of the stack voltage, and the recording medium may be read by a computer.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a vehicle 100A and 100B including a fuel cell according to an exemplary embodiment will be described with reference to the accompanying drawings.

Figure 1:
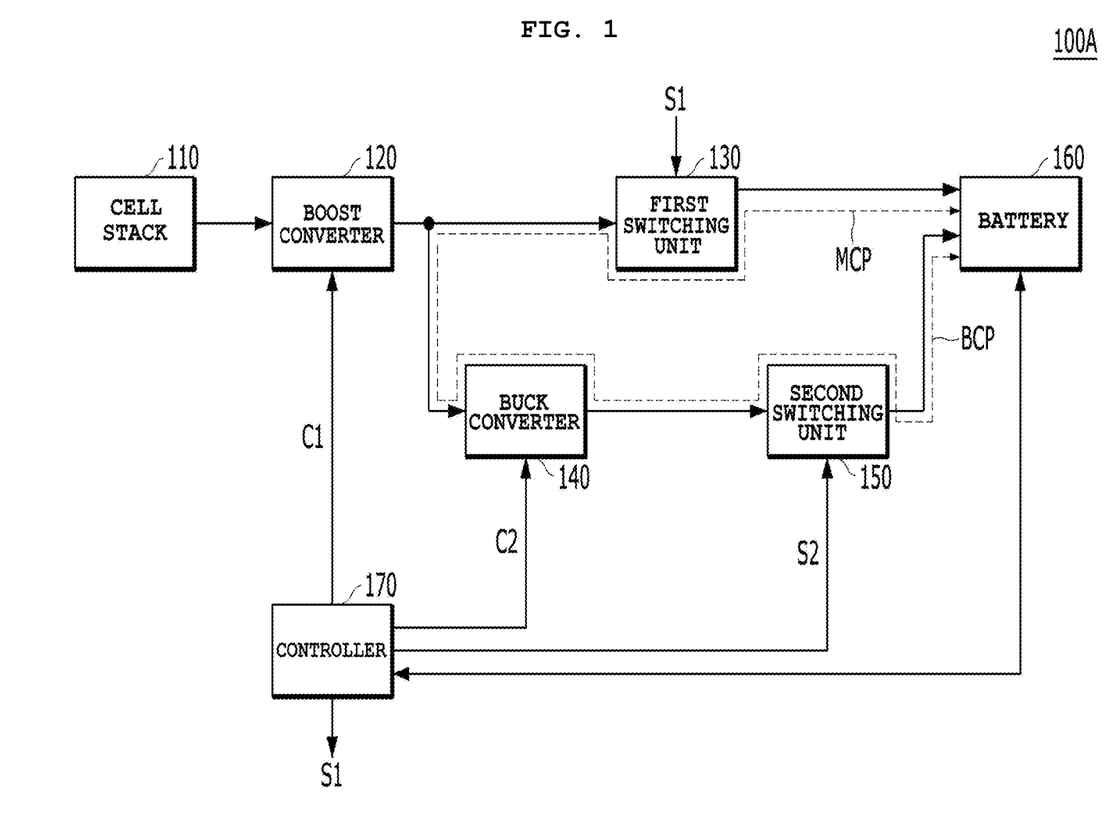
FIG. 1 is a block diagram of a vehicle including a fuel cell according to an exemplary embodiment.

FIG. 1 is a block diagram of a vehicle 100A including a fuel cell according to an exemplary embodiment.

Referring to FIG. 1, the vehicle 100A according to an exemplary embodiment may include a cell stack 110, a boost converter 120, a first switching unit 130, a buck converter 140, a second switching unit 150, a battery 160, and a controller 170.

First, an example of a fuel cell that may be included in the vehicle 100A will be briefly described below, but the disclosure is not limited to any specific form of the fuel cell included in the vehicle 100A.

The fuel cell may be, for example, a polymer electrolyte membrane fuel cell (or a proton exchange membrane fuel cell) (PEMFC), which has been studied most extensively as a power source for driving vehicles. The fuel cell may include a cell stack 110.

The cell stack 110 may include a plurality of unit cells, which are stacked on one another in a first direction. Each unit cell may generate 0.6 volts to 1.0 volts of electricity, on average 0.7 volts of electricity. The number of unit cells may be determined depending on the magnitude of power to be generated in the fuel cell.

Referring to FIG. 1, the boost converter 120 bypasses the voltage generated in the cell stack 110 and output therefrom (hereinafter, referred to as "stack voltage"), or converts the level of the stack voltage and outputs the same in response to a first control signal C1. The stack voltage corresponds to a potential difference between an output terminal (PO shown in FIG. 4 or 5) of a positive-electrode side of the cell stack 110 and an output terminal (NO shown in FIG. 4 or 5) of a negative-electrode side of the cell stack 110. Hereinafter, the voltage output from the boost converter 120 is referred to as "first voltage" for convenience of description.

The first control signal C1 may be generated by the controller 170. When the level of the voltage charged in the battery 160 has not reached the level of the stack voltage, the controller 170 generates the first control signal C1 such that the boost converter 120 bypasses the stack voltage.

Alternatively, when the level of the voltage charged in the battery 160 reaches the level of the stack voltage, the controller 170 performs control such that the boost converter 120 converts the level of the direct-current-type stack voltage and outputs the direct-current-type voltage having the converted level. For example, the boost converter 120 may be a direct-current/direct-current converter that boosts the stack voltage and outputs the boosted voltage as the first voltage. In this case, the boost converter 120 may increase the level of the stack voltage to a level required by the battery 160 or to a level required by a load stage 180 to be described later with reference to FIGS. 4 and 5.

In order to perform the above-described operation, the controller 170 may inspect the level of the voltage charged in the battery 160 and may generate the first control signal C1 according to the result of the inspection.

The first switching unit 130 may be switched on in response to the first switching signal S1, and may form a main path MCP for supplying the first voltage output from the boost converter 120 to the battery 160. The first switching signal S1 may be generated by the controller 170. When the level of the voltage charged in the battery 160 has not reached the level of the stack voltage, the controller 170 may generate the first switching signal S1 to switch the first switching unit 130 off so that the main path MCP is not formed. Alternatively, when the level of the voltage charged in the battery 160 reaches the level of the stack voltage, the controller 170 may generate the first switching signal S1 to switch the first switching unit 130 on so that the main path MCP is formed. That is, when the first switching unit 130 is switched on, the main path MCP, through which current is capable of flowing from the boost converter 120 to the battery 160, may be formed.

In order to perform the above-described operation, the controller 170 may inspect the level of the voltage charged in the battery 160, and may generate the first switching signal S1 according to the result of the inspection.

The buck converter 140 converts the level of the first voltage output from the boost converter 120 and outputs the same to the battery 160 in response to a second control signal C2. Hereinafter, the voltage output from the buck converter 140 is referred to as "second voltage" for convenience of description.

The second control signal C2 may be generated by the controller 170. When the level of the voltage charged in the battery 160 has not reached the level of the stack voltage, the controller 170 may generate the second control signal C2 so that the buck converter 140 converts the level of the stack voltage bypassed from the boost converter 120. Alternatively, when the level of the voltage charged in the battery 160 reaches the level of the stack voltage, the controller 170 stops the operation of the buck converter 140 through the second control signal C2.

The boost converter 120 may increase the level of the stack voltage, whereas the buck converter 140 may decrease the level of the first voltage.

In order to perform the above-described operation, the controller 170 may inspect the level of the voltage charged in the battery 160 and may generate the second control signal C2 according to the result of the inspection.

The second switching unit 150 may be switched in response to the second switching signal S2, and may form a bypass path BCP for supplying the second voltage output from the buck converter 140 to the battery 160. The second switching signal S2 may be generated by the controller 170. When the level of the voltage charged in the battery 160 has not reached the level of the stack voltage, the controller 170 may generate the second switching signal S2 to switch the second switching unit 150 on so that the bypass path BCP is formed. Alternatively, when the level of the voltage charged in the battery 160 reaches the level of the stack voltage, the controller 170 may generate the second switching signal S2 to switch the second switching unit 150 off so that the bypass path BCP is not formed. That is, when the second switching unit 150 is switched on, the bypass path BCP, through which current is capable of flowing from the boost converter 120 to the battery 160, may be formed.

In order to perform the above-described operation, the controller 170 may inspect the level of the voltage charged in the battery 160 and may generate the second switching signal S2 according to the result of the inspection.

As described above, when the first switching unit 130 is switched on, the second switching unit 150 is switched off, and when the first switching unit 130 is switched off, the second switching unit 150 is switched on. Accordingly, the controller 170 may generate the first and second switching signals S1 and S2 such that the first switching unit 130 and the second switching unit 150 are alternately switched.

According to the embodiment, the rated power of the buck converter 140 (hereinafter, referred to as "second rated power") is lower than the rated power of the boost converter 120 (hereinafter, referred to as "first rated power").

In the state in which the level of the voltage charged in the battery 160 has not reached the level of the stack voltage, when the current generated by the boost converter 120, having high rated power, flows through the main path MCP, the internal elements of the boost converter 120 or the battery 160 may be damaged. This will be described later in detail with reference to FIG. 4.

However, according to the embodiment, in the state in which the level of the voltage charged in the battery 160 has not reached the level of the stack voltage, the current flows to the battery 160 through the bypass path BCP, which is formed by the buck converter 140, having low rated power, and the second switching unit 150, rather than flowing through the main path MCP, whereby the boost converter 120 and the battery 160 may be prevented from being damaged.

According to the embodiment, the second rated power may be 5% to 10% of the first rated power, but the disclosure is not limited thereto.

In addition, the rated power of the second switching unit 150 (hereinafter, referred to as "third rated power"), which forms the bypass path BCP together with the buck converter 140, may be 5% to 10% of the first rated power.

In addition, each of the second rated power and the third rated power may be determined according to the time (or the period) required for the level of the voltage charged in the battery 160 to reach the level of the stack voltage.

Figure 2:
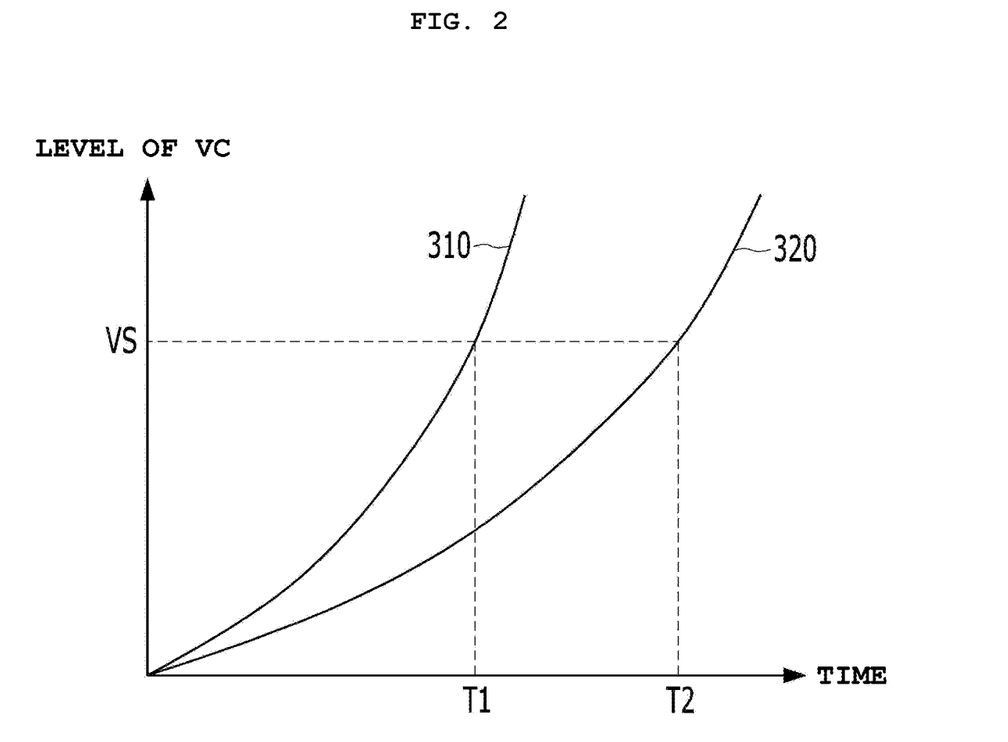
FIG. 2 is a graph exemplarily illustrating the time taken for the level of voltage charged in a battery to reach the level of stack voltage.

FIG. 2 is a graph exemplarily illustrating the time taken for the level of the voltage VC charged in the battery 160 to reach the level VS of the stack voltage, in which the horizontal axis denotes time and the vertical axis denotes the level of the voltage VC charged in the battery 160.

Referring to FIG. 2, in a first case 310, a first time T1 is taken for the level of the voltage VC charged in the battery 160 to reach the level VS of the stack voltage. In a second case 320, a second time T2 is taken for the level of the voltage VC charged in the battery 160 to reach the level VS of the stack voltage.

The values of the second rated power and the third rated power may be increased in order for the level of the voltage VC charged in the battery 160 to reach the level VS of the stack voltage more quickly. For example, in the first case, in which the first time T1 is taken for the level of the voltage VC charged in the battery 160 to reach the level VS of the stack voltage, each of the second rated power and the third rated power may be 10% of the first rated power. In the second case, in which the second time T2 is taken for the level of the voltage VC charged in the battery 160 to reach the level VS of the stack voltage, each of the second rated power and the third rated power may be 5% of the first rated power. However, the disclosure is not limited to any specific ratio of each of the second rated power and the third rated power to the first rated power.

Figure 3:
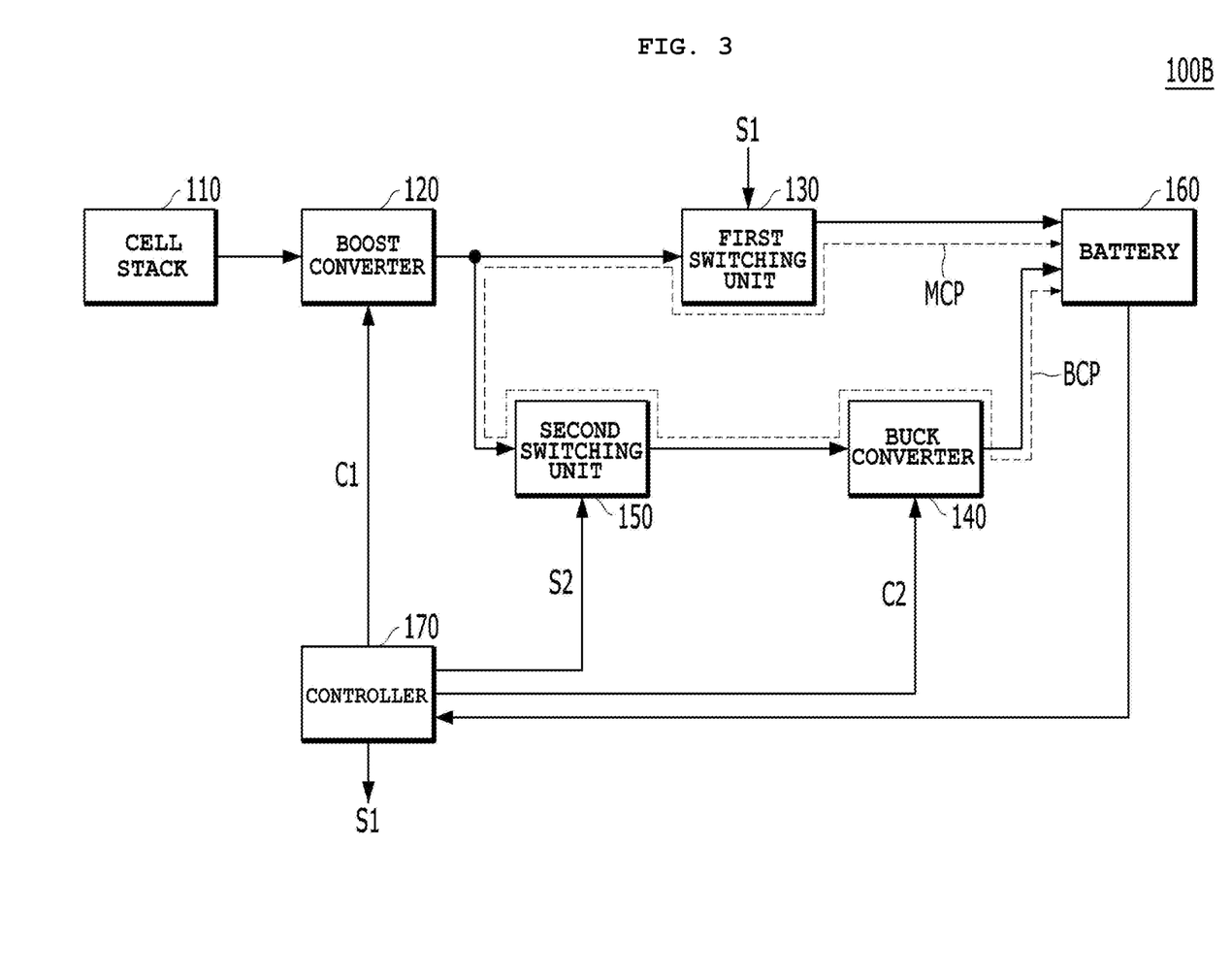
FIG. 3 is a block diagram of a vehicle including a fuel cell according to another exemplary embodiment.

FIG. 3 is a block diagram of a vehicle 100B including a fuel cell according to another exemplary embodiment.

Similar to the vehicle 100A shown in FIG. 1, the vehicle 100B shown in FIG. 3 may include a cell stack 110, a boost converter 120, a first switching unit 130, a buck converter 140, a second switching unit 150, a battery 160, and a controller 170.

However, while the vehicle 100A shown in FIG. 1 is configured such that the second switching unit 150 is disposed between the buck converter 140 and the battery 160, the vehicle 100B shown in FIG. 3 is configured such that the second switching unit 150 is disposed between the boost converter 120 and the buck converter 140. Except for the position at which the second switching unit 150 is disposed, the vehicle 100B shown in FIG. 3 is the same as the vehicle 100A shown in FIG. 1. That is, the cell stack 110, the boost converter 120, the first switching unit 130, the buck converter 140, the second switching unit 150, the battery 160, and the controller 170 shown in FIG. 3 correspond to the cell stack 110, the boost converter 120, the first switching unit 130, the buck converter 140, the second switching unit 150, the battery 160, and the controller 170 shown in FIG. 1, respectively, and thus a duplicate description thereof will be omitted.

Hereinafter, an example of implementation of the vehicle 100A including a fuel cell shown in FIG. 1 will be described with reference to FIG. 4.

Figure 4:
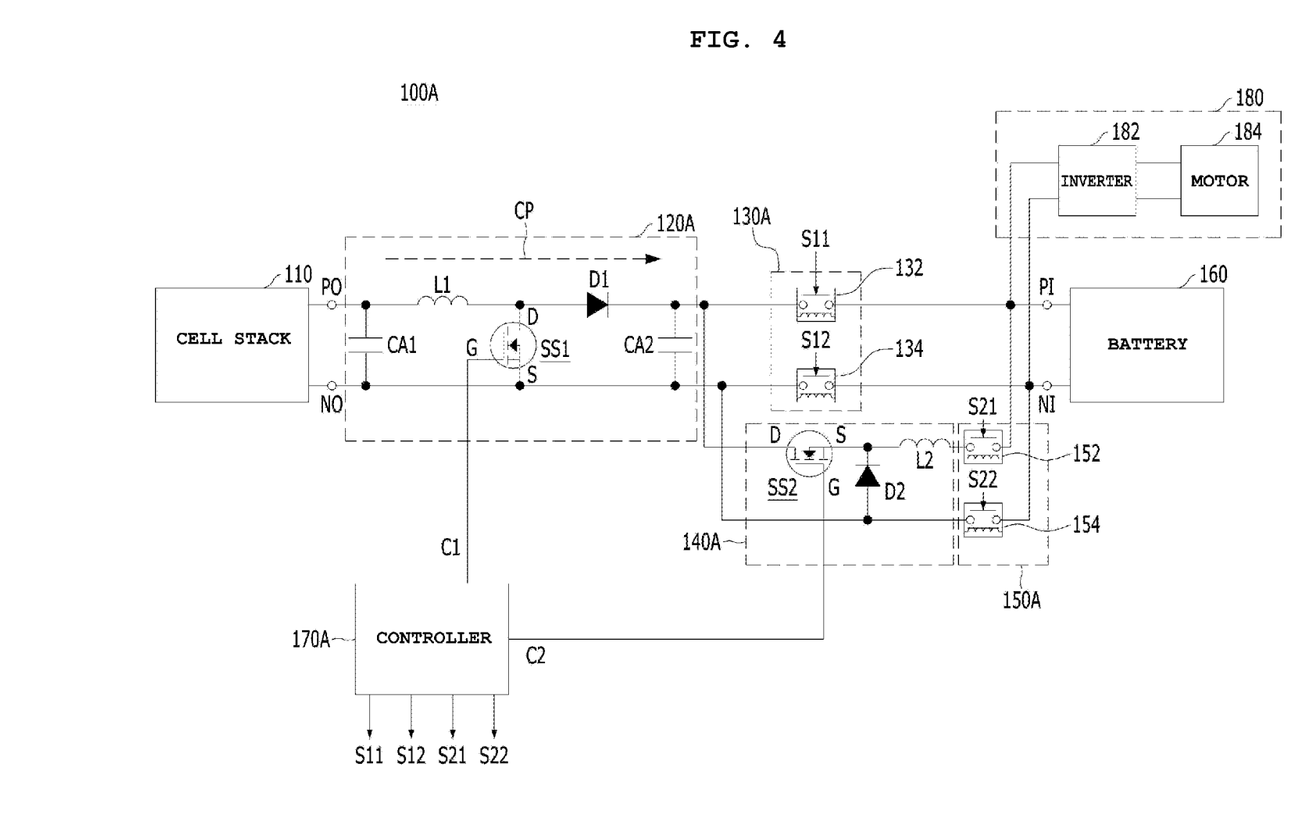
FIG. 4 is a circuit diagram according to an exemplary embodiment of the vehicle shown in FIG. 1.

FIG. 4 is a circuit diagram according to an exemplary embodiment of the vehicle 100A shown in FIG. 1.

The vehicle 100A shown in FIG. 4 may include a cell stack 110, a boost converter 120A, a first switching unit 130A, a buck converter 140A, a second switching unit 150A, a battery 160, and a controller 170A. The cell stack 110, the boost converter 120A, the first switching unit 130A, the buck converter 140A, the second switching unit 150A, the battery 160, and the controller 170A shown in FIG. 4 perform the same functions as the cell stack 110, the boost converter 120, the first switching unit 130, the buck converter 140, the second switching unit 150, the battery 160, and the controller 170 shown in FIG. 1, respectively, and thus a duplicate description thereof will be omitted.

Further, the boost converter 120A, the first switching unit 130A, the buck converter 140A, the second switching unit 150A, and the controller 170A shown in FIG. 4 correspond to the respective embodiments of the boost converter 120, the first switching unit 130, the buck converter 140, the second switching unit 150, and the controller 170 shown in FIG. 1.

The boost converter 120A may include first and second capacitors CA1 and CA2, a first inductor L1, a first diode D1, and a first semiconductor switch.

The first capacitor CA1 may be disposed between an output terminal PO of a positive-electrode side of the cell stack 110 and an output terminal NO of a negative-electrode side of the cell stack 110.

The first inductor L1 has one end connected to the output terminal PO of the positive-electrode side of the cell stack 110 and the other end connected to the positive electrode of the first diode D1. That is, the first inductor L1 is disposed between the output terminal PO of the positive-electrode side of the cell stack 110 and the positive electrode of the first diode D1.

The first diode D1 has a positive electrode connected to the other end of the first inductor L1.

The second capacitor CA2 may be disposed between a negative electrode of the first diode D1 and the output terminal NO of the negative-electrode side of the cell stack 110.

The first and second capacitors CA1 and CA2 are smoothing capacitors.

The first semiconductor switch may be switched on or off in response to the first control signal C1, and may be connected to the positive electrode of the first diode D1 and the output terminal NO of the negative-electrode side of the cell stack 110 while being disposed therebetween.

The first semiconductor switch may be implemented as an insulated gate bipolar transistor (IGBT) or a field effect transistor (FET). For example, as illustrated in FIG. 4, the first semiconductor switch may be implemented as a first transistor SS1. The first transistor SS1 may include a gate G connected to the first control signal C1, a drain D connected to the positive electrode of the first diode D1, and a source S connected to the output terminal NO of the negative-electrode side of the cell stack 110.

The operation of the boost converter 120A having the above-described configuration will be described below.

When the level of the voltage charged in the battery 160 is lower than the level of the stack voltage and it is thus desired to form the bypass path BCP, the first transistor SS1, which is the first semiconductor switch, may be turned off in response to the first control signal C1 output from the controller 170A, and current may flow in the direction indicated by the arrow CP. On the other hand, when the level of the voltage charged in the battery 160 reaches the level of the stack voltage and it is thus desired to form the main path MCP, the first transistor SS1, which is the first semiconductor switch, may be turned on in response to the first control signal C1 output from the controller 170A, and the operation of boosting the stack voltage may be performed.

The first switching unit 130A may include first and second switches 132 and 134.

The first switch 132 may be disposed between the negative electrode of the first diode D1 and an input terminal PI of a positive-electrode side of the battery 160, and may be switched on or off in response to a 1-$1^{st}$ switching signal S11.

The second switch 134 may be disposed between an output terminal NO of a negative-electrode side of the cell stack 110 and an input terminal NI of a negative-electrode side of the battery 160, and may be switched on or off in response to a 1-$2^{nd}$ switching signal S12.

The first and second switches 132 and 134 may be switched on at the same time, or may be switched off at the same time. Therefore, the 1-$1^{st}$ switching signal S11 and the 1-$2^{nd}$ switching signal S12 may be the same signal. Here, each of the 1-$1^{st}$ switching signal S11 and the 1-$2^{nd}$ switching signal S12 corresponds to the first switching signal S1 described above.

The buck converter 140A may include a second inductor L2, a second semiconductor switch, and a second diode D2.

The second inductor L2 may include one end connected to the input terminal PI of the positive-electrode side of the battery 160 via the second switching unit 150A and the other end connected to the negative electrode of the second diode D2. That is, the second inductor L2 may be disposed between the input terminal PI of the positive-electrode side of the battery 160 and the negative electrode of the second diode D2. Also, the second inductor L2 may be connected to the input terminal PI of the positive-electrode side of the battery 160 and the negative electrode of the second diode D2.

The second semiconductor switch may be switched on or off in response to the second control signal C2, and may be connected to the negative electrode of the first diode D1 and the other end of the second inductor L2 while being disposed therebetween. Similar to the first semiconductor switch, the second semiconductor switch may also be implemented as an IGBT or an FET. For example, as illustrated in FIG. 4, the second semiconductor switch may be implemented as a second transistor SS2. The second transistor SS2 may include a gate G connected to the second control signal C2, a drain D connected to the negative electrode of the first diode D1, and a source S connected to the other end of the second inductor L2 (i.e. the negative electrode of the second diode D2).

The second diode D2 may include a negative electrode connected to the other end of the second inductor L2 and a positive electrode connected to the output terminal NO of the negative-electrode side of the cell stack 110.

The operation of the buck converter 140A having the above-described configuration will be described below.

When the level of the voltage charged in the battery 160 is lower than the level of the stack voltage and it is thus desired to form the bypass path BCP, the second transistor SS2, which is the second semiconductor switch, may be turned on in response to the second control signal C2 output from the controller 170A.

On the other hand, when the level of the voltage charged in the battery 160 reaches the level of the stack voltage and it is thus desired to form the main path MCP, the second transistor SS2, which is the second semiconductor switch, may be turned off in response to the second control signal C2 output from the controller 170A.

As described above, when the main path MCP is formed, the bypass path BCP may not be formed, and when the main path MCP is not formed, the bypass path BCP may be formed.

The fact that the first rated power of the boost converter 120 and 120A is higher than the second rated power of the buck converter 140 and 140A means that the first inductor L1 and the first diode D1, which are included in the boost converter 120A, withstand higher current without being damaged than the second inductor L2 and the second diode D2, which are included in the buck converter 140A. For example, the second inductor L2 and the second diode D2 may be capable of withstanding only about 5% to 10% of the level of the current that the first inductor L1 and the first diode D1 may be capable of withstanding.

The second switching unit 150A may include third and fourth switches 152 and 154.

The third switch 152 may be disposed between one end of the second inductor L2 and the input terminal PI of the positive-electrode side of the battery 160, and may be switched on or off in response to a 2-$1^{st}$ switching signal S21.

The fourth switch 154 may be disposed between the positive electrode of the second diode D2 and the input terminal NI of the negative-electrode side of the battery 160, and may be switched on or off in response to a 2-$2^{nd}$ switching signal S22.

The third and fourth switches 152 and 154 may be switched on at the same time, or may be switched off at the same time. Therefore, the 2-$1^{st}$ switching signal S21 and the 2-$2^{nd}$ switching signal S22 may be the same signal. Each of the 2-$1^{st}$ switching signal S21 and the 2-$2^{nd}$ switching signal S22 corresponds to the second switching signal S2 described above.

The fact that the first rated power of the boost converter 120 and 120A is higher than the third rated power of the second switching unit 150A means that the first inductor L1 and the first diode D1, which are included in the boost converter 120A, are capable of withstanding higher current without being damaged than the third and fourth switches 152 and 154, which are included in the second switching unit 150A. For example, the third and fourth switches 152 and 154 may be capable of withstanding only about 5% to 10% of the level of the current that the first inductor L1 and the first diode D1 may be capable of withstanding.

Hereinafter, an example of implementation of the vehicle 100B including a fuel cell shown in FIG. 3 will be described with reference to FIG. 5.

Figure 5:
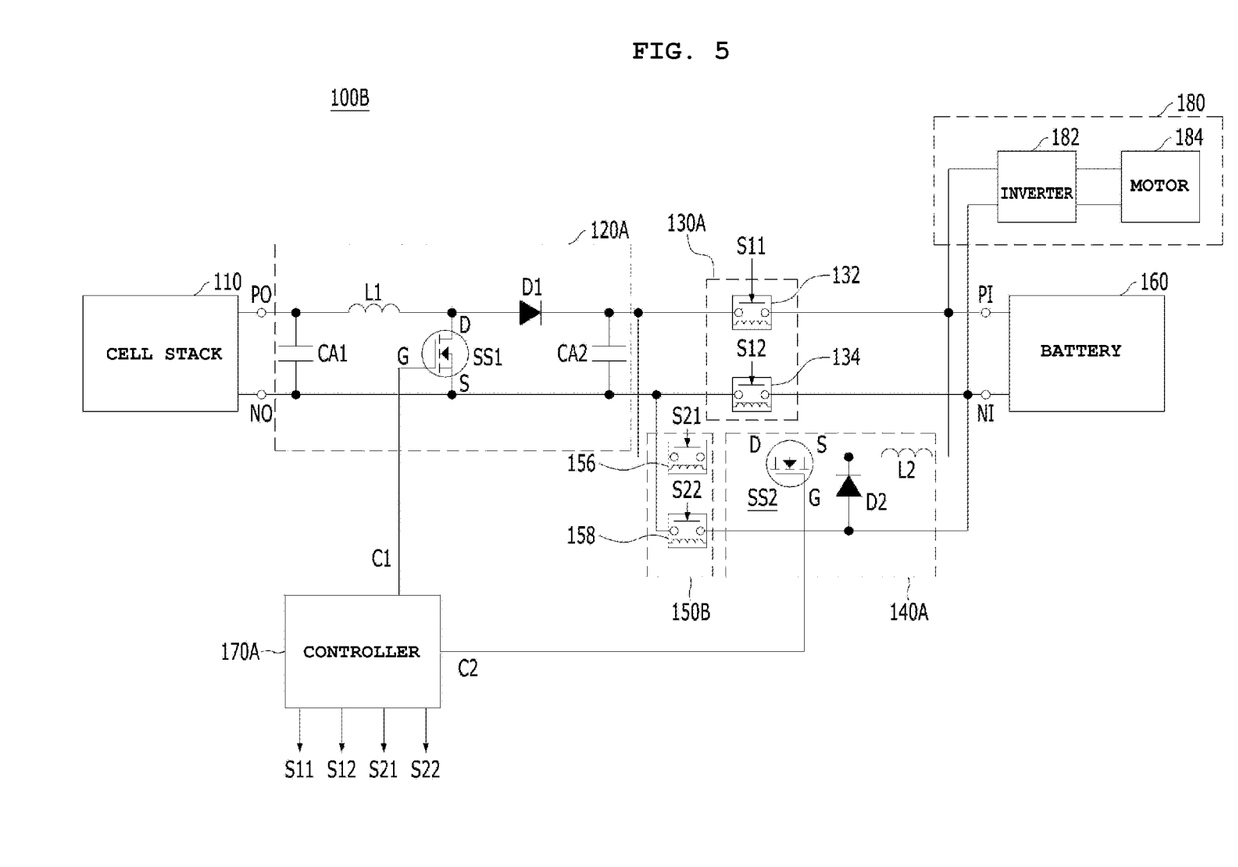
FIG. 5 is a circuit diagram according to an exemplary embodiment of the vehicle shown in FIG. 3.

FIG. 5 is a circuit diagram according to an exemplary embodiment of the vehicle 100B shown in FIG. 3.

The vehicle 100B shown in FIG. 5 may include a cell stack 110, a boost converter 120A, a first switching unit 130A, a buck converter 140A, a second switching unit 150B, a battery 160, and a controller 170A.

While the vehicle 100A shown in FIG. 4 is configured such that the second switching unit 150A is disposed between the buck converter 140A and the battery 160, the vehicle 100B shown in FIG. 5 is configured such that the second switching unit 150B is disposed between the boost converter 120A and buck converter 140A. Except for this difference, the vehicle 100B shown in FIG. 5 is the same as the vehicle 100A shown in FIG. 4, and thus a duplicate description thereof will be omitted. Therefore, only the second switching unit 150B shown in FIG. 5, which is disposed at a position different from that shown in FIG. 4, will be described below.

The second switching unit 150B may include fifth and sixth switches 156 and 158.

The fifth switch 156 may be disposed between the negative electrode of the first diode D1 and the drain D of the second transistor SS2, which is the second semiconductor switch, and may be switched on or off in response to the 2-1$^{st}$ switching signal S21.

The sixth switch 158 may be disposed between the output terminal NO of the negative-electrode side of the cell stack 110 and the positive electrode of the second diode D2, and may be switched on or off in response to the 2-2$^{nd}$ switching signal S22.

The fifth and sixth switches 156 and 158 may be switched on at the same time or may be switched off at the same time. Therefore, the 2-1$^{st}$ switching signal S21 and the 2-2$^{nd}$ switching signal S22 may be the same signal. Each of the 2-1$^{st}$ switch signal S21 and the 2-2$^{nd}$ switching signal S22 corresponds to the second switching signal S2 described above.

At least one of the first and second switches 132 and 134, which are included in the first switching unit 120A shown in FIGS. 4 and 5, the third and fourth switches 152 and 154, which are included in the second switching unit 150A shown in FIG. 4, or the fifth and sixth switches 156 and 158, which are included in the second switching unit 150B shown in FIG. 5, may include a relay, a semiconductor switch, or a diode. However, the disclosure is not limited to any specific form of each of the first to sixth switches 132, 134, 152, 154, 156 and 158.

For example, when a first switching signal S1 having a "high" level (e.g. 12 volts) is supplied from the controller 170 and 170A, each of the first and second switches 132 and 134 may be switched on, and when a first switching signal S1 having a "low" level (e.g. 0 volts) is supplied from the controller 170 and 170A, each of the first and second switches 132 and 134 may be switched off.

Further, when a second switching signal S2 having a "high" level (e.g. 12 volts) is supplied from the controller 170 and 170A, each of the third to sixth switches 152, 154, 156 and 158 may be switched on, and when a second switching signal S2 having a "low" level (e.g. 0 volts) is supplied from the controller 170 and 170A, each of the third to sixth switches 152, 154, 156 and 158 may be switched off.

The vehicle 100A and 100B including a fuel cell according to the embodiment may further include a load stage 180, as shown in FIGS. 4 and 5.

When the first switching unit 130A is switched on to form the main path MCP, the load stage 180 may be connected to the main path MCP to receive the first voltage output from the boost converter 120A. Alternatively, regardless of the formation of the main path MCP by the first switching unit 130A, the load stage 180 may receive the voltage charged in the battery 160.

For example, the load stage 180 may include an inverter 182 and a motor 184.

The inverter 182 is connected to the input terminal PI of the positive-electrode side of the battery 160 and the input terminal NI of the negative-electrode side of the battery 160. The inverter 182 converts the direct-current-type first voltage supplied thereto or the direct-current-type voltage charged in the battery 160 into alternating-current-type voltage, and outputs the alternating-current-type voltage to the motor 184 according to the driving state of the vehicle 100A and 100B.

The motor 184 may be driven in response to the alternating-current-type voltage output from the inverter 182. That is, the motor 184 may rotate by receiving the alternating-current-type voltage for the motor from the inverter 182, and may propel the vehicle 100A and 100B. For example, the motor 184 may be a three-phase AC rotating device including a rotor having a permanent magnet embedded therein. However, the disclosure is not limited to any specific form of the motor 184.

In addition, although not illustrated, the load stage 180 of the vehicle 100A and 100B may include components required for driving the vehicle, such as motor-driven power steering (MDPS), a radiator fan, headlights, and the like. Each of the various loads included in the load stage 180 may be driven by receiving the first voltage or the voltage charged in the battery 160 as driving voltage.

Hereinafter, a battery-charging method according to an exemplary embodiment performed in the vehicle 100A and 100B including a fuel cell described above will be described with reference to the accompanying drawings.

Figure 6:
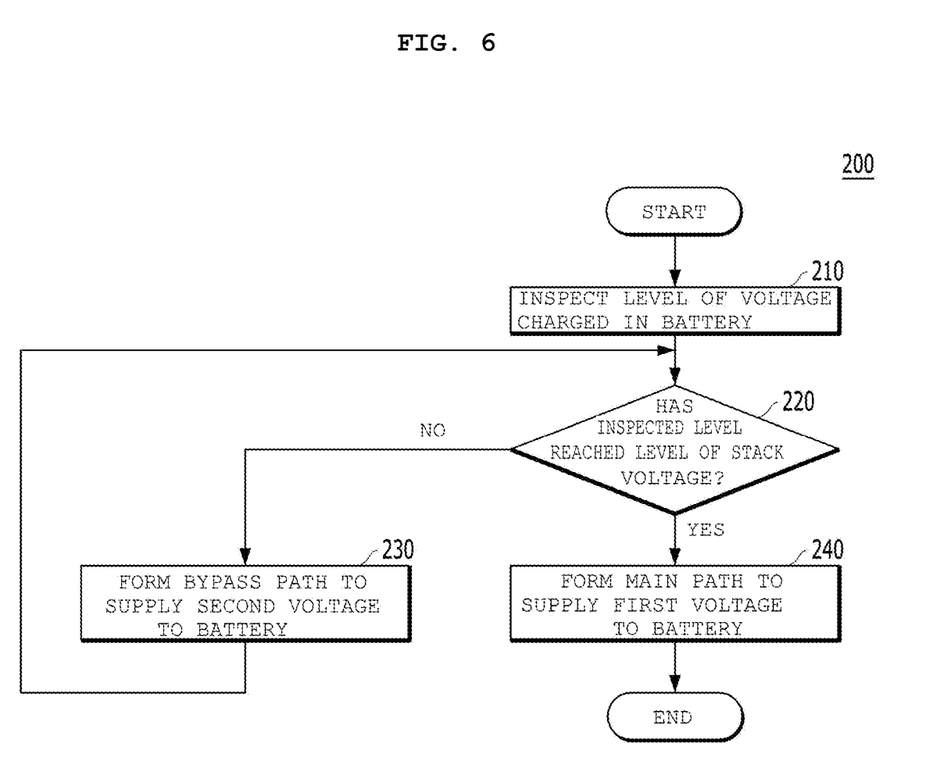
FIG. 6 is a flowchart illustrating a battery-charging method according to an exemplary embodiment.

FIG. 6 is a flowchart illustrating a battery-charging method 200 according to an exemplary embodiment.

The battery-charging method 200 according to the embodiment shown in FIG. 6 may be performed in the vehicle 100A and 100B shown in FIG. 1, 3, 4 or 5, but the disclosure is not limited thereto. That is, according to another exemplary embodiment, the battery-charging method 200 according to the embodiment shown in FIG. 6 may also be performed in a vehicle including a fuel cell, which has a different configuration from the vehicle 100A and 100B shown in FIG. 1, 3, 4 or 5.

Alternatively, the controller 170 and 170A of the vehicle 100A and 100B shown in FIG. 1, 3, 4 or 5 may perform the battery-charging method 200 according to the embodiment shown in FIG. 6, but the disclosure is not limited thereto. That is, according to another exemplary embodiment, the controller 170 and 170A of the vehicle 100A and 100B shown in FIG. 1, 3, 4 or 5 may perform a battery-charging method having a process different from the battery-charging method 200 according to the embodiment shown in FIG. 6.

First, the level of the voltage charged in the battery 160 is inspected (step 210).

After step 210, whether the inspected level of the voltage charged in the battery 160 has reached the level of the stack voltage is determined (step 220).

If the inspected level of the voltage charged in the battery 160 has not reached the level of the stack voltage, the bypass path BCP is formed to supply the second voltage, formed by converting the level of the first voltage bypassed from the boost converter 120 and 120A, to the battery 160 (step 230), and the procedure returns to step 220. To this end, upon determining that the inspected level of the voltage charged in the battery 160 has not reached the level of the stack voltage, the controller 170 and 170A switches the first switching unit 130 and 130A off using the first switching signal S1, and switches the second switching unit 150, 150A and 150B on using the second switching signal S2.

On the other hand, if the inspected level of the voltage charged in the battery 160 has reached the level of the stack voltage, the main path MCP is formed to supply the first voltage, the level of which is converted by the boost converter 120 and 120A, to the battery 160 (step 240). To this end, upon determining that the inspected level of the voltage charged in the battery 160 has reached the level of the stack voltage, the controller 170 and 170A switches the first switching unit 130 and 130A on using the first switching signal S1, and switches the second switching unit 150, 150A and 150B off using the second switching signal S2.

In general, a vehicle includes various kinds of electronic control units (ECUs). An ECU is a kind of computer having therein software capable of performing various functions for a vehicle. The battery-charging method 200 according to the embodiment described above may be executed by an ECU.

A recording medium on which a program for executing the battery-charging method 200, which is performed in the vehicle 100A and 100B including a fuel cell, is recorded may have stored thereon a program for implementing a function of determining whether the level of the voltage charged in the battery 160 has reached the level of the stack voltage, a function of forming the bypass path to supply the second voltage to the battery 160 when the level of the voltage charged in the battery 160 has not reached the level of the stack voltage, and a function of forming the main path to supply the first voltage to the battery 160 when the level of the voltage charged in the battery 160 reaches the level of the stack voltage. The recording medium may be read by a computer.

The computer-readable recording medium includes all kinds of recording devices in which data that may be read by a computer system are stored. Examples of the computer-readable recording medium may include ROM, RAM, a CD-ROM, a magnetic tape, a floppy disk, and an optical data storage device. The computer-readable recording medium may also be distributed over network-coupled computer systems so that the computer-readable code is stored and executed by e.g., a processor, in a distributed fashion. Also, functional programs, code, and code segments for accomplishing the battery-charging method may be easily devised by programmers skilled in the art to which the present disclosure pertains.

The aforementioned controllers according to an exemplary embodiment of the present disclosure may be a processor (e.g., computer, microprocessor, CPU, ASIC, circuitry, logic circuits, etc.). The controllers may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Hereinafter, a vehicle according to a comparative example and the vehicle 100A and 100B according to the embodiment will be described.

It is assumed that a vehicle according to a first comparative example is the same as the vehicle 100A and 100B according to the embodiment, except that it does not include the buck converter 140 or the second switching unit 150 shown in FIGS. 1, 3, 4 and 5.

In the vehicle according to the first comparative example, the first semiconductor switch SS1 is in the off state in the boost converter 120 and 120A until the level of the voltage charged in the battery 160 reaches the level of the stack voltage, and thus current flows through the first diode D1 in the direction indicated by the arrow CP, as shown in FIG. 4. In this case, a very large level of current may flow in the direction indicated by the arrow CP in the state in which the boost converter 120 and 120A is short-circuited. Therefore, in the case of the vehicle according to the first comparative example, the internal elements CA1, L1, D1 and CA2 of the boost converter 120 and 120A, particularly the first diode D1, may burn out, and the battery 160 may be damaged.

On the other hand, in the vehicle 100A and 100B according to the embodiment, until the level of the voltage charged in the battery 160 reaches the level of the stack voltage, in the state in which the boost converter 120 and 120A is short-circuited, a very large level of current is made to flow in the direction indicated by the arrow CP through the bypass path BCP, which is formed by the buck converter 140 and 140A and the second switching unit 150, 150A and 150B. In this case, when current is made to flow through the bypass path BCP formed by the buck converter 140 and 140A, which has the second rated power lower than the first rated power of the boost converter 120 and 120A, and the second switching unit 150, 150A and 150B, which has the third rated power lower than the first rated power of the boost converter 120 and 120A, it may be possible to prevent the internal elements CA1, L1, D1 and CA2 of the boost converter 120 and 120A, particularly the first diode D1, from burning out and to prevent the battery 160 from being damaged.

Figure 7:
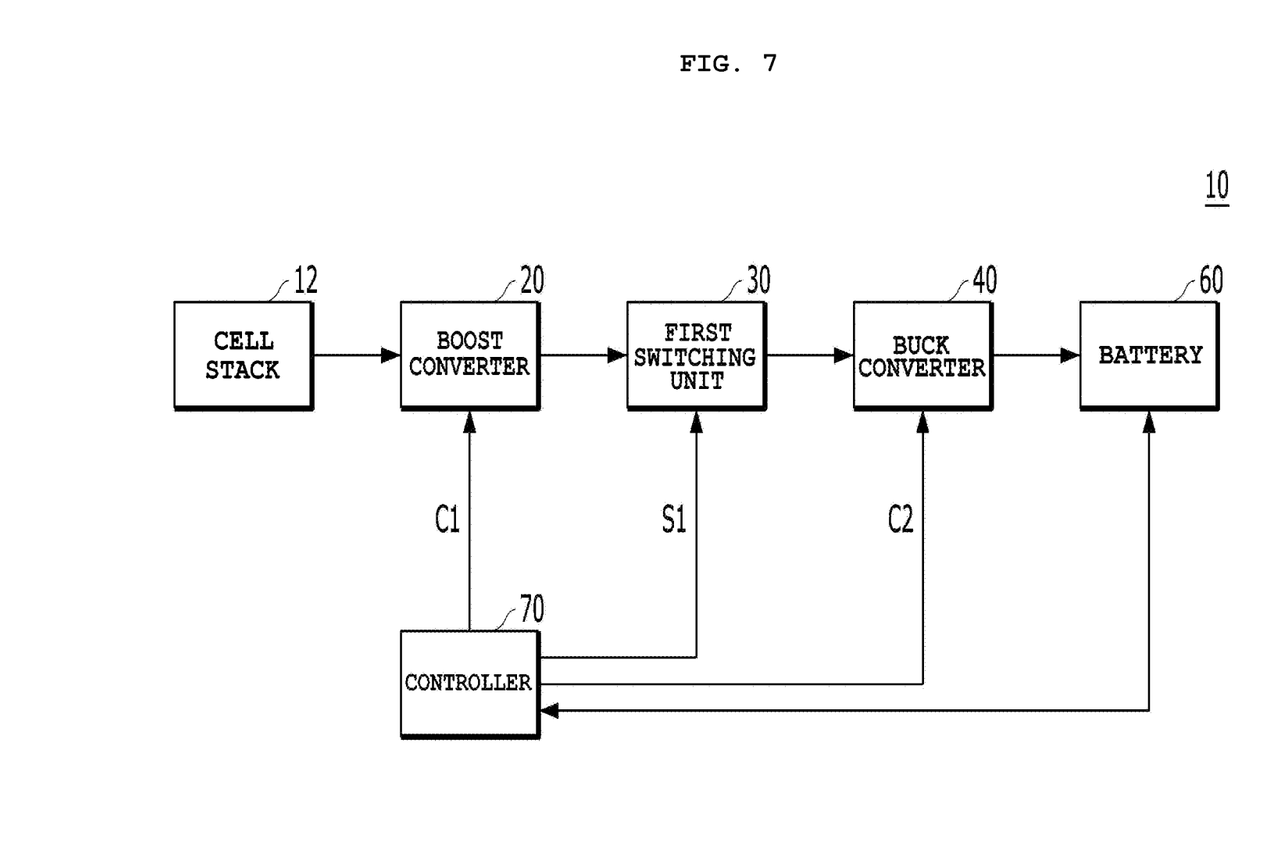
FIG. 7 is a block diagram of a vehicle according to a second comparative example.

FIG. 7 is a block diagram of a vehicle 10 according to a second comparative example.

The vehicle 10 according to the second comparative example shown in FIG. 7 includes a cell stack 12, a boost converter 20, a first switching unit 30, a buck converter 40, a battery 60, and a controller 70. Here, it is assumed that the cell stack 12, the boost converter 20, the first switching unit 30, the buck converter 40, the battery 60, and the controller 70 perform the same functions and have the same configurations as the cell stack 110, the boost converter 120, the first switching unit 130, the buck converter 140, the battery 160, and the controller 170, respectively, of the vehicle 100A and 100B according to exemplary embodiments of the present disclosure. Therefore, first and second control signals C1 and C2 and a first switching signal S1 shown in FIG. 7 perform the same functions as the first and second control signals C1 and C2 and the first switching signal S1 shown in FIGS. 4 and 5, respectively.

In the case of the vehicle 10 according to the second comparative example having the above-described configuration, the buck converter 40 is disposed between the first switching unit 30 and the battery 60 in order to prevent the battery 60 and internal elements of the boost converter 20 from being damaged in the state in which the voltage charged in the battery 60 has not reached the stack voltage.

However, in the case of the vehicle 10 according to the second comparative example, the buck converter 40 is disposed in the path through which power from the cell stack 12 is charged into the battery 60. Therefore, when the battery 60 is charged with power, the power inevitably passes through the buck converter 40, which may lead to deterioration in power-charging efficiency.

On the other hand, in the case of the vehicle 100A and 100B according to the embodiment, as shown in FIGS. 4 and 5, the buck converter 40 shown in FIG. 7 is absent from the path through which power from the cell stack 110 is charged into the battery 160, thereby exhibiting improved power-charging efficiency compared to the second comparative example.

In addition, in the case of the vehicle 10 according to the second comparative example, a process of transmitting driving energy from the cell stack 12 to a load stage (not shown) may be the same as that in the vehicle 100A and 100B according to the embodiment. However, in the case of the vehicle 10 according to the second comparative example, the buck converter 40 is disposed in the path through which driving energy is transmitted from the battery 60 to a load stage (not shown). Therefore, when energy charged in the battery 60 is supplied to the load stage, the energy inevitably passes through the buck converter 40, which may lead to deterioration in efficiency of utilization of charged power.

On the other hand, in the case of the vehicle 100A and 100B according to the embodiment, as shown in FIGS. 4 and 5, the power charged in the battery 160 is directly supplied to the load stage 180, rather than passing through the buck converter 40, thereby exhibiting improved efficiency of utilization of charged power compared to the second comparative example.

As is apparent from the above description, in the case of a vehicle including a fuel cell, a battery-charging method for the vehicle, and a recording medium having a program recorded therein for executing the method according to the embodiments, in the state in which the level of voltage charged in the battery has not reached the level of stack voltage, current is made to flow to the battery through a bypass path formed by a buck converter and a second switching unit, which have rated power lower than the rated power of a boost converter, thereby preventing damage to the boost converter and the battery.

In addition, in the case of a vehicle including a fuel cell, a battery-charging method for the vehicle, and a recording medium having a program recorded therein for executing the method according to the embodiments, no buck converter is disposed in a path through which power from a cell stack is charged into the battery, unlike the second comparative example, thereby exhibiting improved power-charging efficiency compared to the second comparative example.

In addition, in the case of a vehicle including a fuel cell, a battery-charging method for the vehicle, and a recording medium having a program recorded therein for executing the method according to the embodiments, power charged in the battery is directly supplied to a load stage, rather than passing through a buck converter, unlike the second comparative example, thereby exhibiting improved efficiency of utilization of charged power compared to the second comparative example.

The above-described various embodiments may be combined with each other without departing from the scope of the present disclosure unless they are contrary to each other. In addition, for any element of any of the various embodiments that is not described in detail, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A vehicle comprising a fuel cell, the vehicle comprising:
   a battery;
   a cell stack comprising a plurality of unit cells stacked on one another;
   a boost converter configured to bypass a stack voltage output from the cell stack, or to convert a level of the stack voltage and output the bypassed or converted stack voltage as a first voltage in response to a first control signal, the boost converter having first rated power;
   a first switching unit configured to be switched in response to a first switching signal to form a main path to supply the first voltage to the battery;
   a buck converter configured to convert a level of the first voltage and output the converted first voltage to the battery as a second voltage in response to a second control signal, the buck converter having second rated power lower than the first rated power of the boost converter;
   a second switching unit configured to be switched in response to a second switching signal to form a bypass path to supply the second voltage to the battery; and
   a controller configured to inspect a level of a voltage charged in the battery and to generate the first control signal, the second control signal, the first switching signal, and the second switching signal in response to a result of inspecting the level of the voltage charged in the battery.

2. The vehicle of claim 1, wherein the second rated power is 5% to 10% of the first rated power.

3. The vehicle of claim 2, wherein the second switching unit has third rated power, and
   wherein the third rated power is 5% to 10% of the first rated power.

4. The vehicle of claim 3, wherein each of the second rated power and the third rated power is determined according to a time required for the level of the voltage charged in the battery to reach the level of the stack voltage.

5. The vehicle of claim 1, wherein the second switching unit is disposed between the boost converter and the buck converter.

6. The vehicle of claim 1, wherein the second switching unit is disposed between the buck converter and the battery.

7. The vehicle of claim 1, wherein the controller generates the first switching signal and the second switching signal such that the first switching unit and the second switching unit are alternately switched.

8. The vehicle of claim 1, wherein the boost converter comprises:
   a first capacitor disposed between an output terminal of a positive-electrode side of the cell stack and an output terminal of a negative-electrode side of the cell stack;
   a first inductor comprising one end connected to the output terminal of the positive-electrode side of the cell stack;
   a first diode comprising a positive electrode connected to another end of the first inductor;
   a second capacitor disposed between a negative electrode of the first diode and the output terminal of the negative-electrode side of the cell stack; and
   a first semiconductor switch configured to be switched on or off in response to the first control signal, wherein the first semiconductor switch is connected to the positive electrode of the first diode and the output terminal of the negative-electrode side of the cell stack and is disposed between the positive electrode and the output terminal of the negative-electrode side, and wherein the controller generates the first control signal such that the first semiconductor switch is switched off to form the bypass path or such that the first semiconductor switch is switched on to form the main path.

9. The vehicle of claim 8, wherein the first switching unit comprises:
a first switch disposed between the negative electrode of the first diode and an input terminal of a positive-electrode side of the battery, and configured to be switched in response to the first switching signal; and
a second switch disposed between the output terminal of the negative-electrode side of the cell stack and an input terminal of a negative-electrode side of the battery, and configured to be switched in response to the first switching signal.

10. The vehicle of claim 9, wherein each of the first switch and the second switch of the first switching unit includes a relay, a semiconductor switch, or a diode.

11. The vehicle of claim 8, wherein the buck converter comprises:
a second inductor comprising a first side connected to an input terminal of a positive-electrode side of the battery;
a second semiconductor switch configured to be switched on or off in response to the second control signal, wherein the second semiconductor switch is disposed between the negative electrode of the first diode and a second side of the second inductor; and
a second diode comprising a negative electrode connected to the second side of the second inductor and a positive electrode connected to the output terminal of the negative-electrode side of the cell stack,
wherein the controller generates the second control signal such that the second semiconductor switch is switched on to form the bypass path or such that the second semiconductor switch is switched off to form the main path.

12. The vehicle of claim 11, wherein the second switching unit comprises:
a third switch disposed between the first side of the second inductor and the input terminal of the positive-electrode side of the battery, and configured to be switched in response to the second switching signal; and
a fourth switch disposed between the positive electrode of the second diode and an input terminal of a negative-electrode side of the battery, and configured to be switched in response to the second switching signal.

13. The vehicle of claim 12, wherein each of the third switch and the fourth switch of the second switching unit includes a relay, a semiconductor switch, or a diode.

14. The vehicle of claim 11, wherein the second switching unit comprises:
a fifth switch disposed between the negative electrode of the first diode and the second semiconductor switch, and configured to be switched in response to the second switching signal; and
a sixth switch disposed between the output terminal of the negative-electrode side of the cell stack and the positive electrode of the second diode, and configured to be switched in response to the second switching signal.

15. The vehicle of claim 14, wherein each of the fifth switch and the sixth switch of the second switching unit includes a relay, a semiconductor switch, or a diode.

16. The vehicle of claim 1, further comprising:
a load stage connected to the main path and configured to receive the first voltage or to receive the voltage charged in the battery.

17. The vehicle of claim 16, wherein the load stage comprises:
an inverter connected to an input terminal of a positive-electrode side of the battery and an input terminal of a negative-electrode side of the battery, the inverter being configured to convert the first voltage supplied thereto in a direct current form into an alternating-current-type first voltage or to convert the voltage charged in the battery in a direct current form into an alternating-current-type second voltage; and
a motor configured to be driven in response to the alternating-current-type first voltage or the alternating-current-type second voltage.

18. A battery-charging method for a vehicle comprising a battery, a cell stack comprising a plurality of unit cells stacked on one another, a boost converter configured to bypass a stack voltage output from the cell stack or to convert a level of the stack voltage and output the bypassed or converted stack voltage as a first voltage, and a buck converter configured to convert a level of the first voltage and output the converted first voltage as a second voltage, the buck converter having rated power lower than rated power of the boost converter, the method comprising:
inspecting a level of a voltage charged in the battery;
forming a bypass path to supply the second voltage, formed by converting the level of the stack voltage bypassed from the boost converter, to the battery when the inspected level of the voltage charged in the battery has not reached the level of the stack voltage; and
forming a main path to supply the first voltage having a level converted by the boost converter to the battery when the level of the voltage charged in the battery reaches the level of the stack voltage.

19. A non-transitory computer-readable recording medium having a program recorded therein for executing a battery-charging method for a vehicle comprising a cell stack comprising a plurality of unit cells stacked on one another, a boost converter configured to bypass a stack voltage output from the cell stack or to convert a level of the stack voltage and output the bypassed or converted stack voltage as a first voltage, a battery configured to be charged with the first voltage output from the boost converter, and a buck converter configured to convert a level of the first voltage and output the converted first voltage as a second voltage, the buck converter having rated power lower than rated power of the boost converter,
wherein the program, when executed by a processor, causes the processor to:
inspect a level of a voltage charged in the battery;
form a bypass path to supply the second voltage, formed by converting a level of the stack voltage bypassed from the boost converter, to the battery when the inspected level of the voltage charged in the battery has not reached the level of the stack voltage; and
form a main path to supply the first voltage having a level converted by the boost converter to the battery when the level of the voltage charged in the battery reaches the level of the stack voltage.

* * * * *